US011645594B2

(12) United States Patent
Walls et al.

(10) Patent No.: US 11,645,594 B2
(45) Date of Patent: May 9, 2023

(54) REAL-TIME OPTIMIZATION OF AIRCRAFT MANUFACTURING TASK MANAGEMENT

(71) Applicant: The Boeing Company, Chicago, IL (US)

(72) Inventors: Stephen Acey Walls, Tulalip, WA (US); Robert Leon Malone, Mukilteo, WA (US); Kristen Ann Bengtson, Kenmore, WA (US); Michael Marcus Vander Wel, Lynnwood, WA (US); Sharon Filipowski Arroyo, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 40 days.

(21) Appl. No.: 17/005,984

(22) Filed: Aug. 28, 2020

(65) Prior Publication Data

US 2021/0065085 A1    Mar. 4, 2021

Related U.S. Application Data

(60) Provisional application No. 62/892,938, filed on Aug. 28, 2019.

(51) Int. Cl.
| | | |
|---|---|---|
| *G06Q 10/06* | (2012.01) | |
| *G06Q 10/0631* | (2023.01) | |
| *G06F 16/27* | (2019.01) | |
| *G06Q 50/04* | (2012.01) | |
| *G06Q 10/10* | (2023.01) | |

(Continued)

(52) U.S. Cl.
CPC ... *G06Q 10/06313* (2013.01); *G05B 19/4155* (2013.01); *G06F 16/27* (2019.01); *G06N 20/00* (2019.01); *G06Q 10/06316* (2013.01); *G06Q 10/063114* (2013.01); *G06Q 10/063118* (2013.01); *G06Q 10/10* (2013.01);
(Continued)

(58) Field of Classification Search
CPC .................................................. G06Q 10/06
See application file for complete search history.

(56) References Cited

U.S. PATENT DOCUMENTS

| | | | | |
|---|---|---|---|---|
| 10,108,400 B1 * | 10/2018 | Myren | ................. | G06F 8/355 |
| 2005/0005272 A1 * | 1/2005 | Moody | ................. | G06Q 10/06 |
| | | | | 718/104 |

(Continued)

*Primary Examiner* — Kurtis Gills
(74) *Attorney, Agent, or Firm* — McDonnell Boehnen Hulbert & Berghoff LLP (57) ABSTRACT

In an example, a method is performed by a computing system that is one of a group of computing systems involved in facilitating a manufacturing of an aircraft. The method comprises generating a plurality of manufacturing task work statements (MTWSs), each MTWS being associated with a task involved in the manufacturing and comprising smart contract data and computer code. The method also comprises receiving system state information indicating (i) a schedule according to which the aircraft is to be manufactured, (ii) resources available for use in executing the MTWSs, and (iii) one or more aircraft certification requirements with which the tasks involved in the manufacturing of the aircraft are to comply. The method also comprises executing the MTWSs based on the system state information and storing, in a blockchain-based distributed ledger accessible by the group of computing systems, an end state result of the execution of each MTWS.

20 Claims, 4 Drawing Sheets

(51) Int. Cl.
*G06Q 30/018* (2023.01)
*G06N 20/00* (2019.01)
*G05B 19/4155* (2006.01)

(52) U.S. Cl.
CPC ........... *G06Q 30/018* (2013.01); *G06Q 50/04* (2013.01); *G05B 2219/32423* (2013.01)

(56) References Cited

U.S. PATENT DOCUMENTS

| | | | | |
|---|---|---|---|---|
| 2009/0099898 | A1* | 4/2009 | Ehrman | G06Q 10/06 705/7.15 |
| 2018/0341915 | A1* | 11/2018 | Narasimhan | G06Q 50/30 |
| 2019/0279227 | A1* | 9/2019 | Chantz | G06F 21/64 |
| 2019/0384587 | A1* | 12/2019 | Rao | H04L 9/3239 |
| 2020/0028691 | A1* | 1/2020 | Rao | G06F 8/658 |
| 2020/0184548 | A1* | 6/2020 | Rao | G06Q 50/18 |
| 2020/0184739 | A1* | 6/2020 | Nathan | G06Q 10/20 |
| 2020/0304290 | A1* | 9/2020 | Coulmeau | H04L 9/008 |

* cited by examiner

REAL-TIME OPTIMIZATION OF AIRCRAFT MANUFACTURING TASK MANAGEMENT

CROSS-REFERENCE TO RELATED APPLICATIONS

The present disclosure claims priority to U.S. Provisional Application No. 62/892,938 filed on Aug. 28, 2019, the entire contents of which are herein incorporated by reference.

FIELD

The present disclosure relates generally to an integrated system for optimizing aircraft manufacturing, and more particularly, to real-time monitoring and execution of manufacturing tasks using a distributed ledger, optimization, and machine learning.

BACKGROUND

Existing manufacturing processes for an aircraft involve carrying out tasks defined by manufacturing task work statements (MTWSs). Existing MTWSs are typically physical or electronic documents that specify a variety of information related to the task for which the MTWS has been created, such as resources (e.g., people, tools, aircraft components, manufacturing facility/facilities, time, etc.) needed to complete the task and a priority level of the task relative to other tasks (e.g., where in a sequence of tasks the task falls). During the manufacturing of the aircraft, engineers and other individuals will refer the MTWSs and complete tasks in accordance with the MTWSs.

Typically, MTWSs are developed by one or more groups of engineers far in advance of the actual date(s) when the manufacturing is carried out. Further, tasks are often rigidly planned and require a carefully orchestrated sequenced arrival and consumption of aircraft parts, facilities, and skilled human labor. However, conditions can sometimes change within a short amount of time before the time to execute the MTWSs arrives, such as a delayed arrival of aircraft parts. In such scenarios, a quick reassessment and/or reworking of the tasks and execution schedule might be required, which can be time consuming, can pause the manufacturing process, and can involve a large extent of manual labor by engineers and/or administrators, particularly when there are numerous (e.g., hundreds) tasks to complete manufacturing of an aircraft and when the tasks must be complete in a predefined period of time.

Furthermore, Federal Aviation Administration (FAA) certification requires verifiable evidence that proves that a manufactured aircraft exactly matches the description of the aircraft that the FAA had previously approved for the aircraft. Thus, the FAA will audit the data associated with the manufacturing process for the aircraft to ensure compliance. However, because tasks (and thus, MTWSs) can often change during the manufacturing process, it can be labor intensive to maintain, and provide to the FAA, concise, consistent, and accurate data that represents the tasks, results of the tasks, resources, and changes to the tasks and/or resources.

What is needed is an aircraft manufacturing system that improves the management and efficiency of the manufacturing process while maintaining data integrity.

SUMMARY

In an example, a method is described. The method is performed by a computing system that is one of a group of computing systems involved in facilitating a manufacturing of an aircraft. The method comprises generating a plurality of manufacturing task work statements (MTWSs), where each MTWS is associated with a task involved in the manufacturing of the aircraft, where each MTWS comprises smart contract data and computer code, where the smart contract data specifies resources required to complete the task and a priority level of the task relative to tasks with which other MTWSs of the plurality of MTWSs are associated, and where the computer code represents conditional logic for determining whether the smart contract data satisfies one or more conditions for completing execution of the MTWS. The method also comprises receiving system state information indicating (i) a schedule according to which the aircraft is to be manufactured, (ii) resources available for use in executing the plurality of MTWSs, and (iii) one or more aircraft certification requirements with which the tasks involved in the manufacturing of the aircraft are to comply. The method also comprises executing the plurality of MTWSs based on the system state information. The method also comprises storing, in a respective data block of a blockchain-based distributed ledger accessible by the group of computing systems, an end state result of the execution of each MTWS of the plurality of MTWSs.

In another example, a non-transitory computer readable medium having stored thereon instructions, that when executed by one or more processors of a computing system, cause the computing system to perform operations is described. The operations comprise generating a plurality of manufacturing task work statements (MTWSs), where each MTWS is associated with a task involved in a manufacturing of an aircraft, where each MTWS comprises smart contract data and computer code, where the smart contract data specifies resources required to complete the task and a priority level of the task relative to tasks with which other MTWSs of the plurality of MTWSs are associated, and where the computer code represents conditional logic for determining whether the smart contract data satisfies one or more conditions for completing execution of the MTWS. The operations also comprise receiving system state information indicating (i) a schedule according to which the aircraft is to be manufactured, (ii) resources available for use in executing the plurality of MTWSs, and (iii) one or more aircraft certification requirements with which the tasks involved in the manufacturing of the aircraft are to comply. The operations also comprise executing the plurality of MTWSs based on the system state information. The operations also comprise storing, in a respective data block of a blockchain-based distributed ledger accessible by a group of computing systems involved in facilitating the manufacturing of the aircraft, an end state result of the execution of each MTWS of the plurality of MTWSs, where the group of computing systems includes the computing system.

In another example, a computing system is described. The computing system comprises one or more processors, and a non-transitory computer readable medium having stored thereon instructions that, upon execution by the one or more processors, cause the one or more processors to perform operations. The operations comprise generating a plurality of manufacturing task work statements (MTWSs), where each MTWS is associated with a task involved in a manufacturing of an aircraft, where each MTWS comprises smart contract data and computer code, where the smart contract data specifies resources required to complete the task and a priority level of the task relative to tasks with which other MTWSs of the plurality of MTWSs are associated, and where the computer code represents conditional logic for determining whether the smart contract data satisfies one or more conditions for completing execution of the MTWS. The operations also comprise receiving system state information indicating (i) a schedule according to which the aircraft is to be manufactured, (ii) resources available for use in executing the plurality of MTWSs, and (iii) one or more aircraft certification requirements with which the tasks involved in the manufacturing of the aircraft are to comply. The operations also comprise executing the plurality of MTWSs based on the system state information. The operations also comprise storing, in a respective data block of a blockchain-based distributed ledger accessible by a group of computing systems involved in facilitating the manufacturing of the aircraft, an end state result of the execution of each MTWS of the plurality of MTWSs, where the group of computing systems includes the computing system.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Disclosed herein is an improved aircraft manufacturing system (hereinafter referred to as "the system," for the sake of brevity) comprised of multiple different local systems, where each local system corresponds to a respective entity (e.g., a manufacturing shop level group, facility, etc.) involved in one or more aspects of the manufacturing process (e.g., wings, fuselage, propulsion, final integration of various parts, etc.) and further corresponds to the MTWSs for which the entity is responsible. More particularly, the system is an integrated system configured to perform various operations that facilitate optimization of the manufacturing process and maintain data integrity. One or more of such operations can be performed by one or more computing devices (e.g., servers, personal computers, etc.), such as by one or more computing devices of a global computing system configured to control operations of the local systems. Additionally or alternatively, one or more of such operations can be performed by one or more computing devices of a local computing system configured to control operations of a particular local system. In some embodiments, however, a local computing system can be configured to control operations of other local systems as well. Furthermore, in some embodiments, multiple local systems can correspond to the same entity.

In accordance with the present disclosure, a particular MTWS can be authored by an individual, optimization algorithm, or machine learning algorithm trained to identify manufacturing requirements and criteria for successful task execution. In this context, a MTWS corresponds to a particular task to be performed as part of the manufacturing process and, as noted above, can specify a variety of different information related to the task for which the MTWS has been created, such as resources (e.g., people, tools, aircraft components, manufacturing facility/facilities, time, etc.) needed to complete the task and a priority level of the task relative to other tasks (e.g., a position in a sequence of tasks where it is preferred or required that the task falls). In addition, an MTWS can specify one or more steps involved in completing the task, a current status of the resources needed to complete the task, a current status of system level execution, FAA requirements for the task, emergent execution conditions (both for a local system or with respect to the global system), a history of execution results (e.g., successes, failures, notes on why such successes or failures occurred), system-level optimization goals (e.g., a scheduled desired completion time, desired safety goals, etc.), supplemental notes, and/or other manufacturing-related data points.

Furthermore, the disclosed system implements MTWSs as smart contracts that can be managed across the local systems in a blockchain-based distributed ledger. A MTWS that operates as a smart contract can contain contract data and computer code. The contract data can include any of the information discussed above, such as required resources, state information, FAA requirements, a priority level for the task, and/or other possibilities. The computer code can represent conditional logic (e.g., true/false) for determining whether one or more conditions have been met with respect to the contract data and also with respect to external states of other MTWSs, such as "peer" MTWSs (i.e., other MTWSs representing tasks on which execution of the MTWS depends and/or which depend on the execution of the MTWS). Example conditions can include whether the required resources are available, whether a quantity of available resources is within a threshold range of the required quantity of resources for completing the task, and/or whether higher priority/precedence MTWSs have finished executing. In other words, the condition(s) can dictate when the task represented by the MTWS can be carried out.

To determine whether one or more of such conditions are met, the computer code can enable the MTWS to communicate with other MTWSs (e.g., to check and see if another MTWS—particularly, a MTWS that has precedence before the current MTWS—is done executing) and/or might query reference data stored by one or more computing devices of the system. The reference data might include, for example, how many resources are available, execution statuses of different MTWSs, etc. The reference data can be kept up to date by human operators tasked with keeping track of such information. Additionally or alternatively, the system (or a human operator) might update the contract data of the MTWS to reflect the latest state information. For example, if additional resources are made available, the contract data for the MTWS might be updated to indicate the increased quantity of available resources. Other examples are possible as well.

When the condition(s) have been met, a "transaction" (e.g., the task) can be carried out and output data for the executed MTWS is added to the distributed ledger, where the output data represents the carrying out of the transaction and the results of the transaction. This output data for an executed MTWS is referred to herein as an "end state result." For example, the end state result can include (i) true/false data, such as a binary indication of whether the task was carried out, (ii) a binary indication of whether the proper process was followed to complete the task (e.g., whether a sequence of steps were followed in the correct order), (iii) a total quantity of, and/or description of, the resources were used in completing the task, (iv) what contract data changed in the MTWS (e.g., increases/decreases in required resources), (v) an indication of whether the task was completed successfully, (vi) a binary indication of whether the task was completed in accordance with FAA certification requirements, (vii) which FAA certification requirements, if any, were not met upon completion of the task, (viii) a summary of any irregularities that occurred while the task was being completed, and/or (ix) a description of an outcome of the task (e.g., if the task is for measuring the dimensions of an aircraft component, the end state result for the MTWS might include a list of the measurements), among other possible information. Thus, the execution of MTWSs can be tracked and recorded.

In scenarios where one or more conditions are not met, the MTWS, other MTWSs, and/or various computing devices of the system associated with such MTWS(s) can take various responsive actions. To facilitate this, the computer code of the MTWS can include logic that enables the MTWS to communicate with other MTWS, or a computing device responsible for the MTWSs can communicate with other computing device(s) responsible for other MTWSs. In particular, the MTWS can communicate with other MTWSs to (i) report the MTWS's status and the results of the MTWS's conditional logic, (ii) dynamically adjust the execution order of a particular group of MTWSs (e.g., the MTWSs associated with manufacturing the wings of the aircraft), and/or (iii) trade resources with other MTWSs. This manner of communication between MTWSs is also referred to herein as a "negotiation" between MTWSs. As a more particular example, if a first MTWS reports that it is missing a manufacturing technician for completing its task, a second, different MTWS might degrade itself to reduce its required quantity of manufacturing technicians from ten to nine, so that one manufacturing technician could be added to help with the completion of the first MTWS's task. In some scenarios, this degradation might be dependent on other conditions being met, such as whether the second MTWS's task has been successfully completed in the past with nine manufacturing technicians. Other examples are possible as well. It should also be understood that the frequency (time cycle) that a MTWS carries out the conditional logic to determine how to carry itself out is an adjustable value.

In practice, a computing device associated with the execution of the MTWS can be configured to determine when the task has been carried out and responsively change the state of the MTWS to be closed. Additionally or alternatively, a human operator can manually provide an input to a computing device that causes the computing device to responsively change the state of the MTWS. Furthermore, as MTWSs are being executed, MTWSs (or associated computing devices) can communicate to report their execution statuses to each other and/or can store the execution statuses in a centralized model, such as the distributed ledger, so that related MTWSs can be aware of each other's statuses.

In some scenarios, MTWSs can be individually managed and executed without being modified, but in scenarios where conditions change, multiple MTWSs can negotiate changes among each other, such as trading work statement elements (e.g., such as resources, people, tools, etc.) between MTWSs, as noted above. This form of collective intelligence can help the system adapt to the changed conditions and optimize a plan for how one or more of such MTWS will be executed. Thus, even as conditions change, the system, or a local system thereof, can use optimization and artificial intelligence to dynamically modify MTWSs, the schedule for executing the MTWSs, and/or other task-related information to execute the MTWSs in accordance with the modifications. Additionally, the system can collect data that tracks the changes made to the MTWSs/schedule/etc., the resources needed to complete the tasks of the MTWSs, the results (e.g., success, failure, etc.) of the execution of modified MTWSs, and/or other possible information, and then use the collected data as an input into a machine learning and optimization algorithms configured to recognize pattern, learn from past negotiations, and improve the negotiation process by recursively managing group execution of MTWSs in accordance with predefined goals (e.g., using an optimal quantity of resources, meeting safety requirements, completing a group of tasks within a predetermined period of time). Thus, the system can advantageously help reach goals faster with a smaller resource footprint during each production cycle of manufacturing (i.e., each aircraft that is produced).

The system can also optimize the execution of MTWSs using an optimization algorithm configured to identify precedence, resources, and/or other requirements for a task and issue a work order for completion of the task according to the current optimized execution schedule. Furthermore, as MTWSs are being executed (i.e., as the tasks are being carried out and manufacturing of the aircraft is in progress), the system can store and track MTWS data, such as task status, in the distributed ledger to facilitate data integrity. The data in the distributed ledger can then be shared with the FAA or other certifying agency to demonstrate task completion in accordance with aircraft certification requirements.

In addition to the advantages described above, the system makes the aircraft manufacturing process more efficient by optimizing resource usage while simultaneously assuring parts/systems/tasks are made/performed in accordance with documentation provided to the FAA. The system also improves efficiency by shifting the management of the manufacturing process from being performed manually by third-party participants (e.g., industrial engineers, factory managers) to instead being performed at least partially autonomously by the MTWSs (and/or associated computing device(s) responsible for the execution thereof) that contain the comprehensive information (e.g., tasks, tools, engineering) required to progress the manufactured product to certified completeness. Further, the system can increase manufacturing output (e.g., the rate at which aircraft are produced), manufacture aircrafts at a more reliable pace, and make it easier to predict which resources might be needed to complete certain tasks, especially when conditions are changing. The system can provide other improvements and advantages as well.

Figure 1:
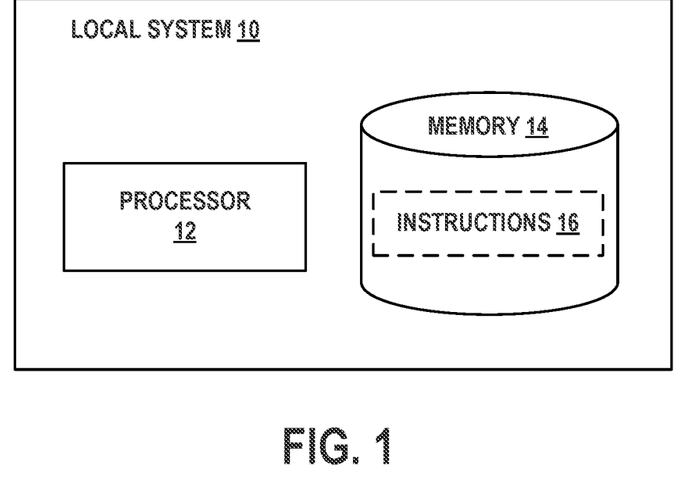
FIG. 1 depicts an example of a local system that is part of the disclosed aircraft manufacturing system, according to an example implementation.

Referring now to the figures, FIG. 1 depicts an example of a local system 10, according to an example implementation. As shown, the local system 10 includes a processor 12, as well as a memory 14 storing instructions 16.

The local system 10 is a computing system that can take the form of one or more virtual and/or physical computational platforms, such as a client device (e.g., a computing device that is actively operated by a user), a server, cloud computing device, or some other type of computational platform. In some examples, the local system 10 is or includes a desktop computer, laptop computer, tablet computer, smartphone, wearable computing device (e.g., augmented reality glasses), or other type of device.

The processor 12 is a general-purpose processor or special purpose processor (e.g., a digital signal processor, application specific integrated circuit, etc.). The processor 12 is configured to execute the instructions 16 (e.g., computer-readable program instructions including computer executable code) that are stored in the memory 14 and are executable to provide various operations described herein, some of which can involve machine learning (e.g., one or more neural networks) or other operations related to artificial intelligence and optimization. In alternative examples, the local system 10 includes additional processors that are configured in the same manner. The instructions 16 include instructions that, when executed by the processor 12, causes the local system 10 to perform operations including at least some of the operations described herein.

The memory 14 is or includes one or more computer-readable storage media that are read or accessed by the processor 12. The computer-readable storage media can include volatile and/or non-volatile storage components, such as optical, magnetic, organic or other memory or disc storage, which can be integrated in whole or in part with the processor 12. The memory 14 is considered non-transitory computer readable media. In some examples, the memory 14 can be implemented using a single physical device (e.g., one optical, magnetic, organic or other memory or disc storage unit), while in other examples, the memory 14 can be implemented using two or more physical devices.

Figure 2:
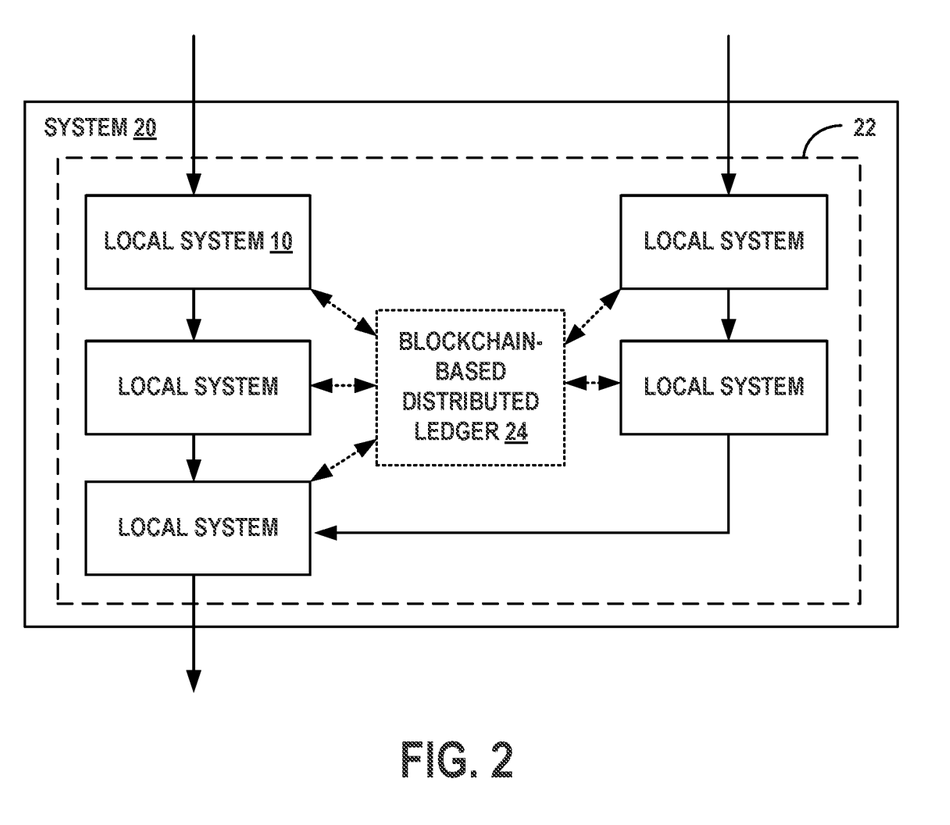
FIG. 2 depicts an example of the disclosed aircraft manufacturing system that includes multiple local systems, according to an example implementation.

FIG. 2 depicts an example of an aircraft manufacturing system (denoted as "system 20") that includes a group of local systems 22 through which the manufacturing of an aircraft is carried out, according to an example implementation. As shown, the group of local systems 22 includes local system 10.

As further shown, each of the local systems has access to, and can store information (e.g., end state results) in, a blockchain-based distributed ledger 24 which, in an example, takes the form of the blockchain-based distributed ledger described above. In an example, the group of local systems 22 can take the form of a peer-to-peer network comprising all of the local systems within system 20, each of which having access to the blockchain-based distributed ledger 24.

In some examples, the group of local systems 22 can be divided into subgroups including one or more local systems. Each such subgroup can be associated with a particular entity, such as a manufacturing shop level group or a particular facility in which at least a portion of the aircraft is manufactured. Additionally or alternatively, each such subgroup can be associated with a respective manufacturing of a particular part of the aircraft, such as the fuselage, the wings, or the propulsion system. For instance, one subgroup can be associated with manufacturing the fuselage, and another subgroup can be associated with manufacturing the wings. Another such subgroup might be dedicated for use in finalizing the completion of the aircraft, such as by integrating and assembling all of the parts manufactured by the other subgroups. Thus, the disclosed method and systems facilitate efficient management of the manufacturing process from start to finish across multiple groups and subgroups of local systems.

Figure 3:
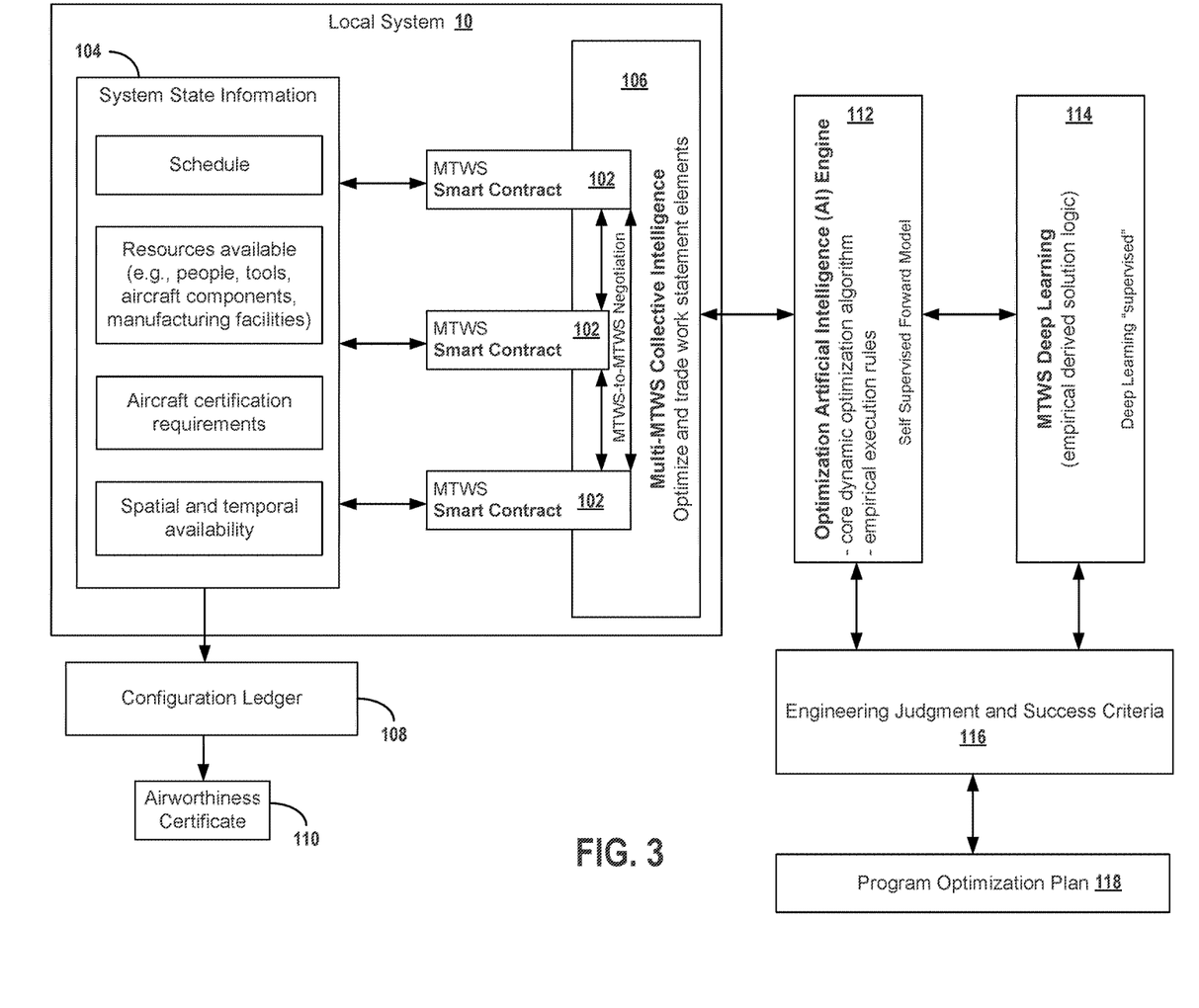
FIG. 3 a block diagram depicting example operations of the disclosed aircraft manufacturing system, according to an example implementation.

FIG. 3 is a block diagram depicting example operations of the disclosed system. A representative example of a local system 10 is shown. The local system 10 can be one of many local systems with which MTWSs are associated. As a representative example, the MTWSs 102 include three MTWSs shown as blocks within the local system 10. Also shown is system state information 104 to which the MTWSs 102 can refer during execution to determine whether conditions are met for carrying out their respective tasks.

In an example, and as shown in FIG. 3, the system state information 104 indicates (i) a schedule according to which the aircraft is to be manufactured, (ii) resources available for use in executing the plurality of MTWSs (e.g., aircraft parts, tools, engineers), and (iii) one or more aircraft certification requirements with which the tasks involved in the manufacturing of the aircraft must comply. The schedule can take the form or of include a list of tasks to be accomplished. In some examples, the schedule can include times at which certain engineers, aircraft parts, tools, or other resources are expected to change locations, be available, or be unavailable for use in manufacturing the aircraft. In some examples, one or more aircraft certification requirements are dictated by an FAA airworthiness certificate 110.

In some examples, and as further shown, the system state information 104 can also indicate spatial and temporal availability in the manufacturing environment (e.g., a manufacturing facility or facilities). In this context, spatial availability addresses, for example, whether there is enough space for the mechanics to work, as there could be a space conflict with other mechanics executing other MTWSs. Additionally, temporal availability addresses, for example, whether there is enough time for the work to be accomplished (e.g., due to end of shift constraints, crane moves, etc.). Other examples of spatial and temporal availability are possible as well.

As further shown in the local system 10 is a block that represents multi-MTWS collective intelligence 106, which refers to the logic embedded in the MTWSs 102 that allows the MTWSs 102 to communicate and negotiate amongst themselves, as discussed above. Communication and negotiation between the MTWSs 102 of the local system 10 can involve, for instance, sharing their states (e.g., how far along in their respective execution they each are) and collectively making execution systems based on emergent conditions (e.g., a sudden lack of resources) that optimize the execution of the MTWSs 102 by the local system 10.

Outside of the local system 10, a block that represents configuration ledger 108 is shown. The configuration ledger 108 can be the blockchain-based distributed ledger 24 described above, which can include a history of MTWSs that were previously executed by the local system 10 and/or other local systems, as well as end state results of those previously-executed MTWSs. For example, the configuration ledger 108 can include confirmations that execution of previous MTWSs have met the one or more aircraft certification requirements dictated by an FAA airworthiness certificate 110.

Once the local system 10 has executed the MTWSs 102 based on the system state information 104, the local system 10 can store, in a respective data block of the configuration ledger 108, an end state result of the execution of each MTWS of the MTWSs 102.

Furthermore, once all the MTWSs associated with a particular aircraft have been executed and the aircraft is completed, thus completing one production cycle, one or more of the local systems can store in the configuration ledger 108 a total end state result for the completed aircraft. The total end state result can include at least a portion of the information described above, but in the context of the entire manufacturing process for that completed aircraft. For example, the total end state result can indicate (i) true/false data, such as a binary indication of whether the aircraft was completed, (ii) a binary indication of whether the proper process was followed to complete the aircraft (e.g., whether a sequence of MTWSs were executed in the correct order), (iii) a total quantity of, and/or description of, the resources were used in completing the aircraft, (iv) a summary of what contract data changed across all the MTWSs (e.g., increases/decreases in required resources), (v) an indication of whether the aircraft was completed successfully, (vi) a binary indication of whether the aircraft meets all of the FAA certification requirements, (vii) which FAA certification requirements, if any, were not met upon completion of the aircraft, and/or (viii) a summary of any irregularities that occurred while the aircraft was being completed, among other possible information.

FIG. 3 also depicts a block that represents an optimization artificial intelligence engine 112, as well as a block that represents MTWS deep learning 114. The optimization artificial intelligence engine 112 and the MTWS deep learning 114 each operate in accordance with engineering judgment and success criteria 116, as well as with a program optimization plan 118.

The optimization artificial intelligence engine 112 and the MTWS deep learning 114 each represent respective computer logic that can stored and executed by a single computing device (e.g., a local system, or a global system that manages operations of the local systems) and/or by a group of computing devices (e.g., multiple local systems). Additionally or alternatively, the computer logic can refer collectively to the individual logic on each of the MTWSs 102 that the local system 10 executes, on each of the MTWSs across multiple local systems, or on each of the MTWSs across the entire system (i.e., across all local systems).

Before the manufacturing process begins, the optimization artificial intelligence engine 112 can determine a starting plan based on initial conditions. The optimization artificial intelligence engine 112 performs operations for short-term learning. More particularly, the optimization artificial intelligence engine 112 is configured to determine how to plan the manufacturing process, including any adjustments needed to MTWSs, based on conditions, events, etc. that have happened in more-recent time window (e.g., within minutes, hours, or days) from when manufacturing begins or across a lower quantity of produced aircrafts (e.g., the last ten aircrafts built). After MTWSs for a local system have executed for a particular aircraft, for instance, the local system can output, to the optimization artificial intelligence engine 112, end state results of the executions, such as an indication of success, an indication of failure (e.g., the work did not get done on time and needs or needed to be moved to another local system), whether each task was performed as scheduled, what might have caused a task to not be performed correctly or on time, and/or other relevant information. The optimization artificial intelligence engine 112 can then take that information into account when either planning for the future or making real-time adjustments to local system activity (e.g., moving an MTWS to another local system to execute).

The optimization artificial intelligence engine 112 can also take into account emergent conditions that might invalidate a previously-determined plan and make adjustments to the plan. Once the MTWSs begin executing, there isn't typically time in practice for engineers to stop the process and reassess all the tasks that need to be performed, and so the optimization artificial intelligence engine 112 advantageously helps place the manufacturing plan in the best state possible before manufacturing begins. If other conditions then emerge during manufacturing, further changes and negotiations can occur at the local system level—namely, between MTWSs, such as changing task precedence, exchanging resources, etc., as discussed above.

The MTWS deep learning 114, on the other hand, represents longer-term memory and learning. In other words, when a local system runs through a production cycle for an aircraft and its MTWSs are executed, the local system can output, to the MTWS deep learning 114, the end state results from which the MTWS deep learning 114 can learn and that the MTWS deep learning 114 can take into account when generating future manufacturing plans. Compared to the optimization artificial intelligence engine 112, the MTWS deep learning 114 can be configured to intelligently recognize patterns from events, conditions, etc. that have happened in a longer time window (e.g., days, months, years) from when manufacturing begins or across a higher quantity of produced aircrafts (e.g., the last hundred or more aircrafts built). These may be patterns that can be more difficult and time consuming for humans to recognize, such as a discovery that a particular task that historically gets done more successfully in the afternoon than in the morning, or a discovery that a task that does not have a required priority might get done more successfully when done before other tasks that also do not have a required priority. Other examples are possible as well.

The engineering judgment and success criteria 116 is guidance on production system performance expectations that the local system 10 and the engineers associated therewith take into account when generating and executing the MTWSs 102. Based on that guidance, tactical solutions are constructed and applied when generating and executing the MTWSs 102. Examples of these solutions include, but are not limited to, a desired duration of each MTWS (e.g., a desired number of hours to complete the task with which the MTWS is associated), assignment cycling of technician crew members, skill(s) developed through on-the-job training, and a reduction of hazardous conditions due to a work sequence. These and/or other solutions can take the form of constraints and objectives when applied to rules according to which the optimization artificial intelligence engine 112 operates.

The program optimization plan 118 include global behavior targets, established by program leadership, according to which the system 20 should operate. Such behavior targets can be conveyed to the engineering community associated with the local system 10 and/or other local systems for translation into actionable system controls. These targets can include business and/or societal considerations, examples of which include cost, first pass success, worker safety, and/or system throughput (i.e., build rate).

Figure 4:
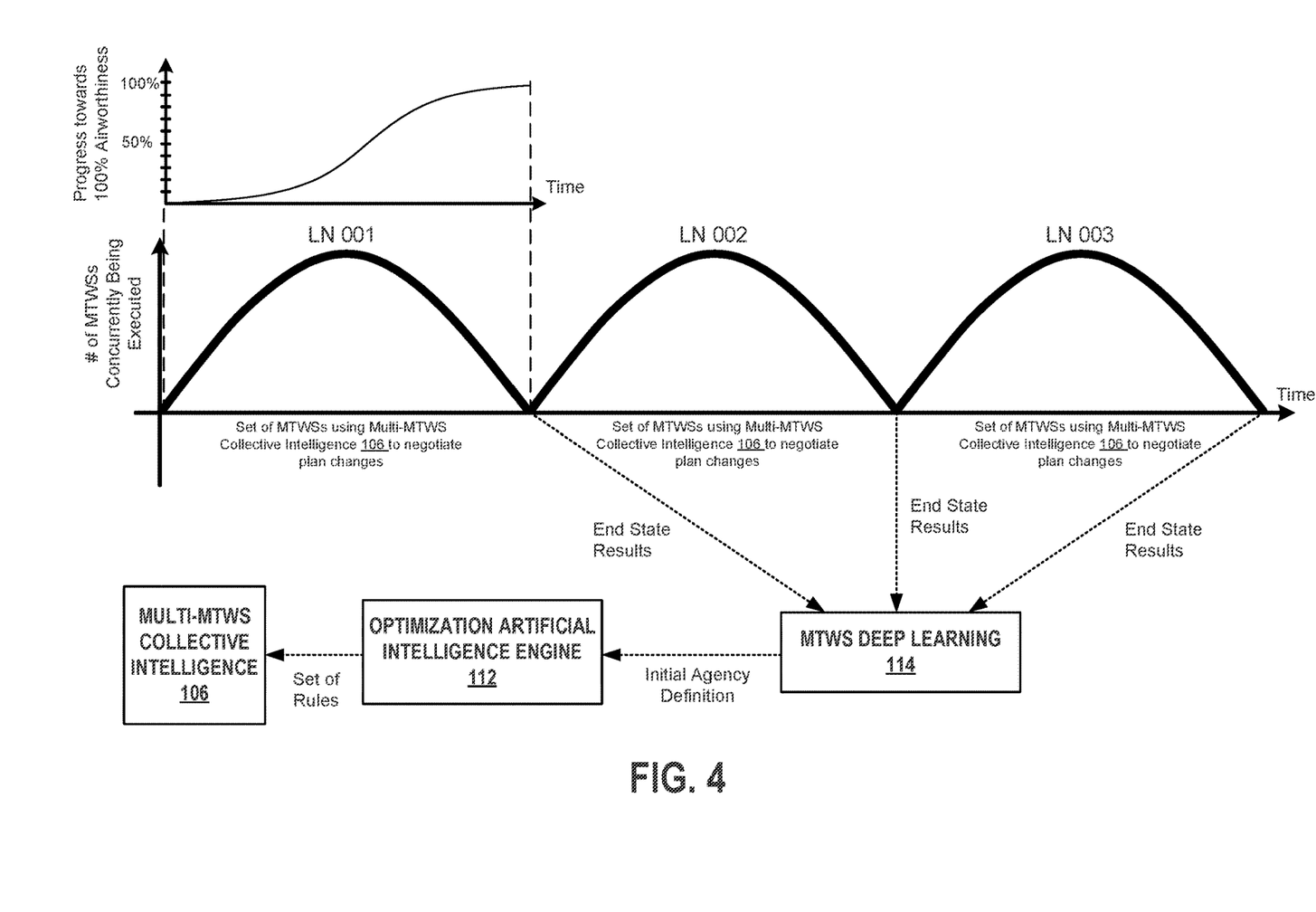
FIG. 4 is a graph and flow chart depicting example operations of the disclosed aircraft manufacturing system, according to an example implementation.

FIG. 4 is a graph and flow chart depicting example operations of the disclosed system. Particularly, FIG. 4 how the local system 10, as well as the entire system, operates over time.

As an example, the local system 10 can execute MTWSs in the manner described above for a first aircraft line number (LN). Once the aircraft is complete, or once the local system 10 completes executing its respective MTWSs, local system 10 can then provide the end state results to the MTWS deep learning 114. This process might then be repeated for at least two additional aircraft line numbers. Based on the end state results acquired over time from the local system 10, as well as other local systems, the MTWS deep learning 114 can generate an "initial agency definition," which represents a set of rules according to which the local system 10 should execute MTWSs and/or according to which the MTWSs that are executed communicate and negotiate. The optimization artificial intelligence engine 112 can then reassess, and potentially revise, the set of rules based on a consolidation of the set of rules with emergent conditions such as those described above. The multi-MTWS collective intelligence 106 can then operate in accordance with the set of rules or revised set of rules from then on and until any other changes are made to the rules. Subsequent end state results can then be fed to the MTWS deep learning 114, which can further refine the set of rules, generate new rules, etc. based on the end state results. These operations can be repeated over time, thus enabling the system to adapt to changing conditions and optimize itself.

As an example, consider a scenario in which, over the course of the production of LN 001, LN 002, and LN 003, the local system 10 (which is associated with fuselage production, in this example) has determined and indicated in the end state results that there was a consistent lack of a particular resource for completing execution of the MTWSs. Based on this, the MTWS deep learning 114 can generate a set of rules that represent a long-term plan to allocate more of the particular resource to the local system 10. Although the optimization artificial intelligence engine 112 receives the set of rules, an unexpected event might occur that results in even more of the particular resource being needed by the local system 10 and/or by other local systems. The optimization artificial intelligence engine 112 can then determine a revised version of the set of rules, such as rules that prevent or allow certain MTWSs from negotiating to exchange the particular resource with others, depending on where the particular resource is most-needed. Other example scenarios are possible as well.

Figure 5:
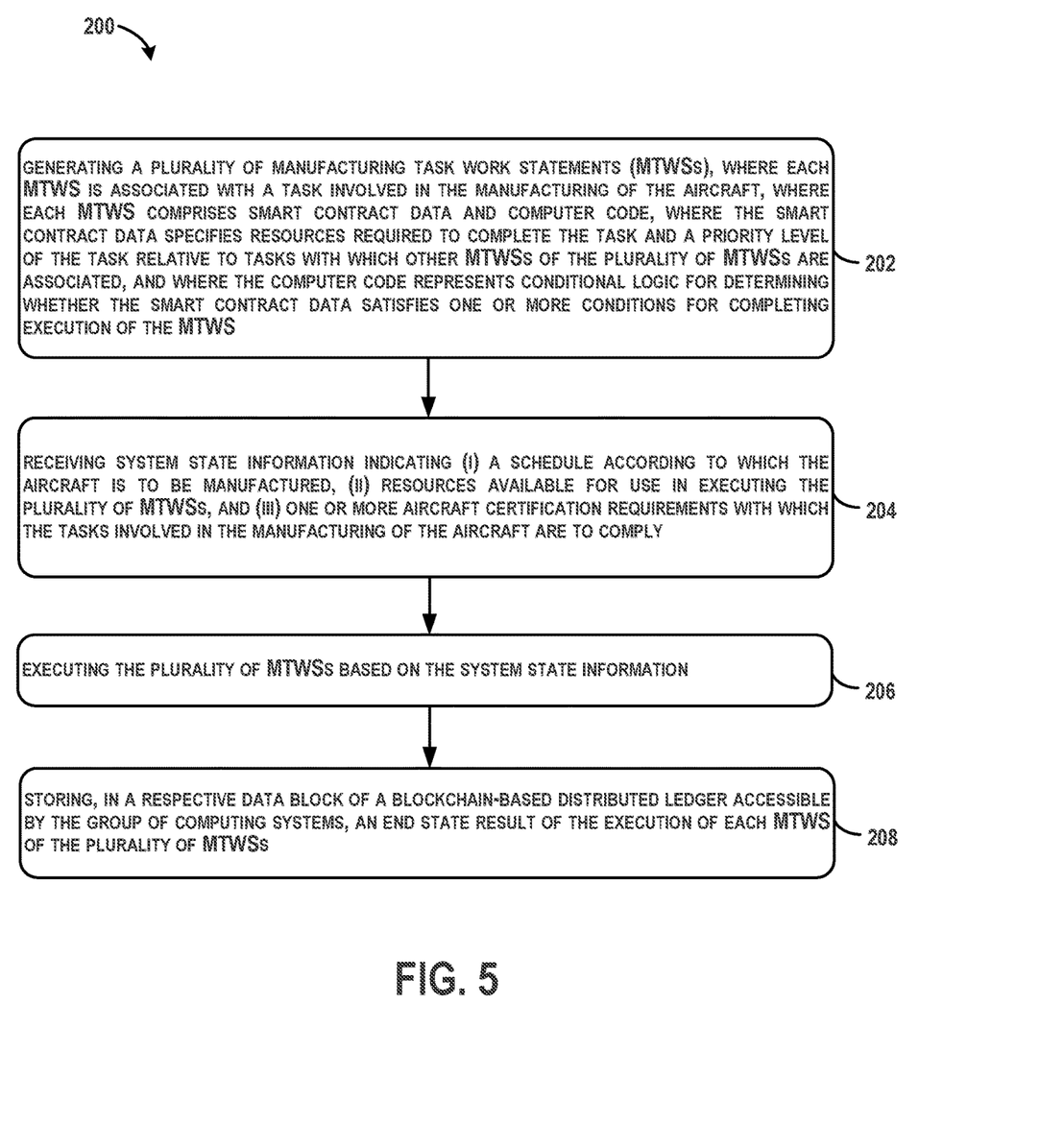
FIG. 5 shows a flowchart of an example of a method that could be used with the local system and the disclosed aircraft manufacturing system shown in FIGS. 1 and 2, according to an example implementation.

FIG. 5 shows a flowchart of an example of a method 200. Method 200 shown in FIG. 5 presents an example of a method that could be used with the local system 10 and the system 20 shown in FIGS. 1 and 2, a combination thereof, or with components thereof. In particular, the method 200 can be performed by a computing system, such as local system 10, that is one of the group of computing systems (e.g., the group of local systems 22) involved in facilitating a manufacturing of an aircraft.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 includes one or more operations, functions, or actions as illustrated by one or more of blocks 202-208. Further, blocks of FIG. 5 may be performed in accordance with one or more of block 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for these and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 5 may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes generating a plurality of manufacturing task work statements (MTWSs), where each MTWS is associated with a task involved in the manufacturing of the aircraft, where each MTWS comprises smart contract data and computer code, where the smart contract data specifies resources required to complete the task and a priority level of the task relative to tasks with which other MTWSs of the plurality of MTWSs are associated, and where the computer code represents conditional logic for determining whether the smart contract data satisfies one or more conditions for completing execution of the MTWS.

At block 204, the method 200 includes receiving system state information indicating (i) a schedule according to which the aircraft is to be manufactured, (ii) resources available for use in executing the plurality of MTWSs, and (iii) one or more aircraft certification requirements with which the tasks involved in the manufacturing of the aircraft are to comply.

At block 206, the method 200 includes executing the plurality of MTWSs based on the system state information.

At block 208, the method 200 includes storing, in a respective data block of a blockchain-based distributed ledger accessible by the group of computing systems, an end state result of the execution of each MTWS of the plurality of MTWSs.

In some examples, the resources available for use in executing the plurality of MTWSs include aircraft parts, tools, and engineers.

In some examples, the act of receiving the system state information can involve receiving system state information indicating (i) the schedule, (ii) the resources, (iii) the one or more aircraft certification requirements, and (iv) a physical space available within a manufacturing environment for use in executing at least one MTWS of the plurality of MTWSs using the resources.

In some examples, the act of receiving the system state information can involve receiving system state information indicating (i) the schedule, (ii) the resources, (iii) the one or more aircraft certification requirements, and (iv) an amount of time available for executing at least one MTWS of the plurality of MTWSs using the resources.

In some examples, the act of storing the end state result can involve storing the end state result in the respective data block of a blockchain-based distributed ledger that includes other data blocks that store a history of previously-executed MTWSs and end state results for the previously-executed MTWSs.

In some examples, the act of storing the end state result can involve storing, in the respective data block of the blockchain-based distributed ledger, an end state result that indicates (i) whether each MTWS of the plurality of MTWSs was successfully executed and (ii) whether each MTWS of the plurality of MTWSs was performed as scheduled.

In some examples, the one or more conditions comprise a condition that the resources available for use in executing the plurality of MTWSs include a quantity of a particular resource that is within a threshold range of the resources required to complete the task specified by the smart contract data.

In some examples, the one or more conditions comprise a condition that the computing system has completed execution of MTWSs whose smart contract data specifies priority levels that are higher than the priority level of the MTWS.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method performed by a computing system, wherein the computing system is one of a group of networked computing systems involved in facilitating a manufacturing of an aircraft, the method comprising:

generating a plurality of manufacturing task work statements (MTWSs), wherein each MTWS is associated with a task involved in the manufacturing of the aircraft, wherein each MTWS comprises smart contract data and computer code, wherein the smart contract data specifies resources required to complete the task and a priority level of the task relative to tasks with which other MTWSs of the plurality of MTWSs are associated, wherein the computer code represents conditional logic for determining whether the smart contract data satisfies one or more conditions for completing execution of the MTWS, and wherein the computer code further comprises logic for facilitating communication between the MTWS and one or more other MTWSs of the plurality of MTWSs;

receiving system state information indicating (i) a schedule according to which the aircraft is to be manufactured, (ii) resources available for use in executing the plurality of MTWSs, and (iii) one or more aircraft certification requirements with which the tasks involved in the manufacturing of the aircraft are to comply;

executing the plurality of MTWSs based on the system state information;

storing, in a respective data block of a blockchain-based distributed ledger accessible by the group of networked computing systems, an end state result of the execution of each MTWS of the plurality of MTWSs;

generating a set of rules representing a long-term plan for allocation of a particular resource; and based on the end state result of one or more of the plurality of MTWSs that were executed, determining a revised version of the set of rules, wherein the set of rules include one or more rules that prevent or allow at least a subset of the MTWSs from negotiating with other MTWSs to exchange the particular resource.

2. The method of claim 1, wherein receiving the system state information comprises receiving system state information indicating (i) the schedule, (ii) the resources, (iii) the one or more aircraft certification requirements, and (iv) a physical space available within a manufacturing environment for use in executing at least one MTWS of the plurality of MTWSs using the resources.

3. The method of claim 1, wherein receiving the system state information comprises receiving system state information indicating (i) the schedule, (ii) the resources, (iii) the one or more aircraft certification requirements, and (iv) an amount of time available for executing at least one MTWS of the plurality of MTWSs using the resources.

4. The method of claim 1, wherein storing, in the respective data block of the blockchain-based distributed ledger, the end state result comprises storing the end state result in the respective data block of a blockchain-based distributed ledger that includes other data blocks that store a history of previously-executed MTWSs and end state results for the previously-executed MTWSs.

5. The method of claim 1, wherein storing, in the respective data block of the blockchain-based distributed ledger, the end state result of the execution of each MTWS of the plurality of MTWSs comprises storing, in the respective data block of the blockchain-based distributed ledger, an end state result that indicates (i) whether each MTWS of the plurality of MTWSs was successfully executed and (ii) whether each MTWS of the plurality of MTWSs was performed as scheduled.

6. The method of claim 1, wherein the one or more conditions comprise a condition that the resources available for use in executing the plurality of MTWSs include a quantity of a particular resource that is within a threshold range of the resources required to complete the task specified by the smart contract data.

7. The method of claim 1, wherein the one or more conditions comprise a condition that the computing system has completed execution of MTWSs whose smart contract data specifies priority levels that are higher than the priority level of the MTWS.

8. The method of claim 1, wherein the resources available for use in executing the plurality of MTWSs include aircraft parts, tools, and engineers.

9. A non-transitory computer readable medium having stored thereon instructions, that when executed by one or more processors of a computing system, cause the computing system to perform operations comprising:
   generating a plurality of manufacturing task work statements (MTWSs), wherein each MTWS is associated with a task involved in a manufacturing of an aircraft, wherein each MTWS comprises smart contract data and computer code, wherein the smart contract data specifies resources required to complete the task and a priority level of the task relative to tasks with which other MTWSs of the plurality of MTWSs are associated, wherein the computer code represents conditional logic for determining whether the smart contract data satisfies one or more conditions for completing execution of the MTWS, and wherein the computer code further comprises logic for facilitating communication between the MTWS and one or more other MTWSs of the plurality of MTWSs;
   receiving system state information indicating (i) a schedule according to which the aircraft is to be manufactured, (ii) resources available for use in executing the plurality of MTWSs, and (iii) one or more aircraft certification requirements with which the tasks involved in the manufacturing of the aircraft are to comply;
   executing the plurality of MTWSs based on the system state information;
   storing, in a respective data block of a blockchain-based distributed ledger accessible by a group of networked computing systems involved in facilitating the manufacturing of the aircraft, an end state result of the execution of each MTWS of the plurality of MTWSs, wherein the group of networked computing systems includes the computing system,
   generating a set of rules representing a long-term plan for allocation of a particular resource; and
   based on the end state result of one or more of the plurality of MTWSs that were executed, determining a revised version of the set of rules, wherein the set of rules include one or more rules that prevent or allow at least a subset of the MTWSs from negotiating with other MTWSs to exchange the particular resource.

10. The non-transitory computer readable medium of claim 9, wherein the system state information further indicates a physical space available within a manufacturing environment for use in executing at least one MTWS of the plurality of MTWSs using the resources.

11. The non-transitory computer readable medium of claim 9, wherein the system state information further indicates an amount of time available for executing at least one MTWS of the plurality of MTWSs using the resources.

12. The non-transitory computer readable medium of claim 9, wherein the blockchain-based distributed ledger includes other data blocks that store a history of previously-executed MTWSs and end state results for the previously-executed MTWSs.

13. The non-transitory computer readable medium of claim 9, wherein the end state result indicates (i) whether each MTWS of the plurality of MTWSs was successfully executed and (ii) whether each MTWS of the plurality of MTWSs was performed as scheduled.

14. The non-transitory computer readable medium of claim 9, wherein the one or more conditions comprise a condition that the resources available for use in executing the plurality of MTWSs include a quantity of a particular resource that is within a threshold range of the resources required to complete the task specified by the smart contract data.

15. The non-transitory computer readable medium of claim 9, wherein the one or more conditions comprise a condition that the computing system has completed execution of MTWSs whose smart contract data specifies priority levels that are higher than the priority level of the MTWS.

16. A computing system comprising:
   one or more processors;
   a non-transitory computer readable medium having stored thereon instructions that, upon execution by the one or more processors, cause the one or more processors to perform operations comprising:
      generating a plurality of manufacturing task work statements (MTWSs), wherein each MTWS is associated with a task involved in a manufacturing of an aircraft, wherein each MTWS comprises smart contract data and computer code, wherein the smart contract data specifies resources required to complete the task and a priority level of the task relative to tasks with which other MTWSs of the plurality of MTWSs are associated, wherein the computer code represents conditional logic for determining whether the smart contract data satisfies one or more conditions for completing execution of the MTWS, and wherein the computer code further comprises logic for facilitating communication between the MTWS and one or more other MTWSs of the plurality o MTWSs;
      receiving system state information indicating (i) a schedule according to which the aircraft is to be manufactured, (ii) resources available for use in executing the plurality of MTWSs, and (iii) one or more aircraft certification requirements with which the tasks involved in the manufacturing of the aircraft are to comply;
      executing the plurality of MTWSs based on the system state information;
      storing, in a respective data block of a blockchain-based distributed ledger accessible by a group of networked computing systems involved in facilitating the manufacturing of the aircraft, an end state result of the execution of each MTWS of the plurality of MTWSs, wherein the group of networked computing systems includes the computing system;
generating a set of rules representing a long-term plan for allocation of a particular resource; and
based on the end state result of one or more of the plurality of MTWSs that were executed, determining a revised version of the set of rules, wherein the set of rules include one or more rules that prevent or allow at least a subset of the MTWSs from negotiating with other MTWSs to exchange that particular resource.

17. The computing system of claim 16, wherein the system state information further indicates a physical space available within a manufacturing environment for use in executing at least one MTWS of the plurality of MTWSs using the resources.

18. The computing system of claim 16, wherein the system state information further indicates an amount of time available for executing at least one MTWS of the plurality of MTWSs using the resources.

19. The method of claim 1, wherein storing, in the respective data block of the blockchain-based distributed ledger, the end state result of the execution of each MTWS of the plurality of MTWSs comprises storing, in the respective data block of the blockchain-based distributed ledger, an end state result that indicates (i) a summary of contract data that was changed across all the MTWSs, wherein the summary comprises a summary of resources that were exchanged with the one or more other MTWSs, (ii) a binary indication of whether the aircraft meets all of the one or more aircraft certification requirements, and (iii) which of the one or more aircraft certification requirements, if any, were not met upon completion of the aircraft.

20. The method of claim 1, wherein the communication between the MTWS and one or more other MTWSs of the plurality of MTWSs comprises (i) reporting, to the one or more other MTWSs, a status of the MTWS and an end result of the execution of the conditional logic, (ii) dynamically adjusting an execution order of a subset of the plurality of MTWSs associated with a subset of components of the aircraft, and (iii) exchanging, with the one or more other MTWSs, available resources to be used when completing the task of the MTWS and one or more corresponding other tasks of the one or more other MTWSs, wherein the exchanging is based at least in part on a history of past task performance by the MTWS.

* * * * *